United States Patent [19]

Fukuzawa et al.

[11] Patent Number: 5,547,705
[45] Date of Patent: Aug. 20, 1996

[54] NONLINEAR OPTICAL DEVICE AND METHOD OF MANUFACTURING SAME

[75] Inventors: Tadashi Fukuzawa, Tokyo-to; Satoru S. Kano, Kanagawa-ken; Kiyoshi Kumata, Tokyo-to, all of Japan; Victor Y. Lee, San Jose; Franklin M. Schellenberg, Cupertino, both of Calif.; Yutaka Takahashi, Tokyo-to, Japan

[73] Assignee: International Business Machine Corporation, Armonk, N.Y.

[21] Appl. No.: 939,965

[22] Filed: Sep. 4, 1992

Related U.S. Application Data

[62] Division of Ser. No. 625,258, Dec. 10, 1990, abandoned.

[30] Foreign Application Priority Data

Dec. 8, 1989 [JP] Japan .................................. 01/317916

[51] Int. Cl.$^6$ ........................................................ B05D 5/06
[52] U.S. Cl. .......................... 427/162; 427/240; 427/384
[58] Field of Search ............................ 357/8, 4; 427/162, 427/240, 384

[56] References Cited

U.S. PATENT DOCUMENTS 5,045,364  9/1991  Fang ........................................ 427/162

OTHER PUBLICATIONS

Richardson et al, Thin Solid Films vol. 179 No. 11, Nov. 1989, pp. 405–411.
Neal, Electronics Letters, vol. 22 No. 9 Apr. 24, 1986 pp. 460–462.
T. Richardson, "The Characterization of Organoruthenium Complexes" Thin Solid Films, v. 179, No. 11, Nov. 1989, Lausanne Ch pp. 405–411.
D. Neal, "Second Harmonic Generation From LB Superlattices Containing Two Active Components" Electronics Letters, vol. 22, No. 9, Apr. 24, 1986, Engage GB pp. 46460–462.
Patent Abstracts of Japan, vol. 013, No. 12 (p. 812) Jun., 1989 JPA-63 220 219, Published Sep., 1988.
S. Y. Yuen and P. A. Wolff: *Technical Digest of Nonlinear Optical Properties of Materials Topical Meeting*, pp. 150–153, Aug. 1988, Troy, NY.
D. A. B. Miller, C. T. Seaton, M. E. Price and S. D. Smith, *Phys. Rev. Lett.* 47, 1011–1017 Jul. (1981).
C. K. N. Patel, R. E. Slusher and P. A. Fleury, *Phys. Rev. Lett.* 17, 1011–1017 (1966) no mo.
D. A. B. Miller, D. S. Chemla, D. J. Eilenberger, P. W. Smith, A. G. Gossard and W. Wiegman, *Phys. Rev. Lett.* 42, 925 Jun. (1983).
H. M. Gibbs, S. S. Tarng, J. L. Jewell, D. A. Weinberger and K. Tai, Appl. Phys. Lett. 41, 221–222 (1982) (no mo.).
A. Honold, L. Schultheis, J. Kuhl and C. W. Tu, *Technical Digest of 16th International Conference of Quantum Electronics*, Tokyo (1988).(no mo.).

(List continued on next page.)

*Primary Examiner*—Janyce Bell
*Attorney, Agent, or Firm*—David Aker

[57] ABSTRACT

A nonlinear optical device comprising a substrate and a film structure coated on to the substrate. The film has, in a direction normal to the substrate, an intercalation structure including a semiconductor layer and an organic layer that lave different energy gaps. The intercalation structure includes a plurality of semiconductor layers and a plurality of organic layers which comprise a quantum well system. The film structure includes an assembly of microcrystals having domain size smaller than that of the wavelength of light with which the device operates. The microcrystals have an axis aligned in a direction normal to the substrate and have randomly oriented axes in a direction parallel to the substrate. A method for producing the device comprises providing a solution of an organic material in a solvent and placing a quantity of the solution on a substrate to form the organic material film structure thereon. The film is formed by spin coating of the solution on the substrate. Preferably the film is comprised of a two-dimensional perovskite such as $(C_{10}H_{21}NH_3)_2PbI_4$. The solvent is acetone or dimethoxyl ethane.

16 Claims, 7 Drawing Sheets

OTHER PUBLICATIONS

T. Ishihara, J. Takahashi and T. Goto, *Solid State Communication*, 69, 933 (1989) (no mo).

E. Hanamura, *Nato Workshop on "Optical Switching in Low-dimensional Systems,"* Maraballa, Spain, Oct. 1988.

Yu. I. Dolzhenko, T. Inaba and Y. Maruyama, Bull. *Chem. Soc. Japan,* 59, 563 Feb. (1986).

D. L. Lee: *Electromagnetic Principles of Integrated Optics,* chapter 6 pp. 147–171 (John Wiley and Sons). (no date).

NONLINEAR OPTICAL DEVICE AND METHOD OF MANUFACTURING SAME

This is a division of application Ser. No. 07/625,258, filed Dec. 10 1990, now abandoned.

TECHNICAL FIELD

This invention relates to devices for optical data-processing or optical communication. More particularly, it relates to devices controlled by external optical or electrical signals.

BACKGROUND ART

The third-order nonlinear optical coefficient $X^{(3)}$ is the key parameter for evaluating materials to be used in non-linear optical devices. Both real and imaginary parts of the refractive index change significantly with the intensity of light only when the value of $X^{(3)}$ is sufficiently large. Optical devices which are to be controlled by an external light or electrical field must have a large value of $X^{(3)}$ for practical application.

Some classes of semiconductor devices are known to have large $X^{(3)}$ and can be integrated with conventional semiconductor optical devices.

The literature concerning these techniques includes the following:

(1) S. Y. Yuen and P. A. Wolff: Technical Digest, pp. 150–153 of Nonlinear Optical Properties of Materials Topical Meeting; August, 1988, Troy, N.Y.

(2) D. A. B. Miller, C. T. Seaton, M. E. Price, and S. D. Smith: Phys. Rev. Lett. 47, 197 (1981).

(3) C. K. N. Patel, R. E. Slusher, and P. A. Fleury: Phys. Rev. Lett. 17, 1011–1017 (1966).

(4) D. A. B. Miller, D. S. Chemla, D. J. Eilenberger, P. W. Smith, A. G. Gossard, and W. Wiegmann: Appl. Phys. Lett., 42, 925 (1983).

(5) H. M. Gibbs, S. S. Tarng, J. L. Jewell, D. A. Weinberger, and K. Tai: Appl. Phys. Lett., 41, 221–222 (1982).

(6) A. Honold, L. Schultheis, J. Kuhl, and C. W. Tu: Technical Digest of 16th International Conf. on Quantum Electronics, Tokyo (1988).

(7) T. Ishihara, J. Takahashi, and T. Goto: Solid State Communication, 69, 933 (1989).

(8) E. Hanamura: Nato workshop on "Optical Switching in Low-dimensional Systems," October (1988), Marballa, Spain.

(9) Yu. I. Dolzhenko, T. Inaba and Y. Maruyama: Bull. Chem. Soc. Japan, 59, 563 (1986).

In a narrow-band-gap semiconductor, band filling (Ref. 2) and nonparabolicity of the conduction band (Ref. 3) cause extremely large nonlinearity (e.g. $X^{(3)}=3\times10^{-1}$ for a single InSb crystal). However, in practice, because the nonlinearity is significant at longer wavelengths (5 μm to 10 μm), this class of semiconductor is not generally considered for use in optical data processing devices.

In order to achieve higher packing density, it is desirable to find other mechanisms for achieving a large value of $X^{(3)}$ at shorter wavelengths. The excitonic transition of semiconductor quantum wells is very promising (Refs. 4, 5). The large value of $X^{(3)}$ is a the result of saturation absorption at exciton resonances. Since the contribution of excitonic transitions (compared to that of inter-band transitions) is larger when the band gap is wide, this mechanism is more favorable at shorter wavelengths. The excitonic process giving rise to large $X^{(3)}$ is common to bulk crystal systems, but the excitonic transition of a modulated structure or quantum well system (when referred to hereafter, the latter includes the former) is more significant because of the enhancement by the quantum confinement effect.

Although this system is far better than bulk crystal systems, it exhibits several practical problems which must be solved.

The exciton binding energy in a quantum well is still low (approximately 10 meV). Therefore, phonons at room temperature decrease the number of excitons, and it is necessary to operate the device below the temperature of liquid nitrogen to obtain strong absorption.

The system response time is long because of the long lifetime of the free carriers. It is therefore difficult to construct a fast device.

Manufacturing a semiconductor quantum well requires expensive equipment and complicated manufacturing processes such as molecular beam epitaxy (MBE) and metal organic chemical vapor deposition (MOCVD).

It is still not possible to make an ideal quantum well with completely flat structure on an atomic scale. Fluctuations in the epitaxial growth process cause irregularity in the size of the quantum well. An exciton lifetime of 2.8 ps is expected for the ideal quantum well system. In practice a lifetime of 180 ps has been observed for an actual system (Ref. 6).

In order to obtain a large value of $X^{(3)}$ and a fast response time, a multi-quantum well semiconductor system without any irregularity in the well structure is required. In this regard, a two-dimensional perovskite semiconductor crystal, $(C_{10}H_{21}NH_3)_2PbI_4$ in a state exhibiting an intercalation of the semiconductor layer and the organic material layer, is drawing attention.

The crystal structure of $(C_{10}H_{21}NH_3)_2PbI_4$ is shown in FIG. 6. As shown in this figure, each mono-layer consisting of $Pb^{2+}$ and I is sandwiched by two layers of alkyl-$NH_3$. The N atom, which is adjacent to the $Pb^{2+}$ ion, forms a ligand field, thereby determining the wavelength of the optical transition of $Pb^{2+}$. What has been described above is an ideal quantum well structure in the form of intercalation of a semiconductor and an organic material and having a constant well thickness of 6.24 Å throughout the crystals. Moreover, the binding energy of the exciton in this quantum well is quite large: the observed value is 370 meV (which is twelve times as large as that of the bulk crystal of $PbI_2$), and thus a strong absorption peak can be observed even at room temperature (300° K.), as shown by curve (a) of FIG. 9.

The two-dimensional perovskite semiconductor crystal looks extremely promising as a nonlinear optical device. However, a problem lies in the difficulty of making a large enough crystal for device application, if the previously reported crystal growth method is used (Ref. 9). It takes one to two months to obtain a single crystal having dimensions of 2×2×0.1 mm³ when using the silica-gel technique. Another problem is the difficulty in controlling the crystal size (especially the crystal thickness) when this technique is used.

DISCLOSURE OF THE INVENTION

It is a principal object of this invention to provide a nonlinear optical data-processing device and a method for producing the device.

It is another object of this invention to provide a nonlinear optical component of high optical quality.

It is yet another object of this invention to provide ultra-fast response time and high nonlinear optical sensitivity in such a device.

It is a further object of this invention to provide a nonlinear optical device and a method for producing it at low cost and utilizing a simple process.

In accordance with the invention, there is provided a nonlinear optical device comprising a substrate and a film structure disposed directly on the substrate. The film has, in a direction normal to the substrate, an intercalation structure including a semiconductor layer and an organic layer that have different energy gaps. The intercalation structure includes a plurality of semiconductor layers and a plurality of organic layers which comprise a quantum well system. The quantum well system is thus a composition modulated structure.

The film structure includes an assembly of microcrystals having domain size smaller than that of the wavelength of light with which the device operates. The microcrystals each have a given axis aligned in a direction normal the substrate and have randomly oriented axes in a direction parallel to the substrate.

The invention provides a method for producing a nonlinear optical device comprising providing a solution of an organic material in a solvent and placing a quantity of the solution on a substrate to form an organic material film thereon with one of its crystal axes oriented in a direction normal to the substrate. The film is formed by spin coating of the solution on the substrate.

The film is comprised of $(C_{10}H_{21}NH_3)_2PbI_4$. The solvent is acetone or dimethoxyl ethane. Alternatively, the film may be comprised of $MX_4(C_nH_{2n+1}NH_3)_2$ where M is a metal ion selected from the group consisting of Cu, Cd, Mn, Ge and Fe, and X is a halogen ion selected from the group consisting of of I, Cl and Br.

BEST MODE FOR CARRYING OUT THE INVENTION

Before describing the structure of devices according to the invention, the synthesis of $(C_{10}H_{21}NH_3)_2PbI_4$ is described:

In a flask, 9.5 g of lead acetate was suspended in 150 ml of distilled water. 2.86 ml of glacial acetic acid was added and stirred. Then 10 ml of decyl amine was added and stirred for 10 minutes. A solution of 16.6 g of potassium iodide in 100 ml distilled water was added to the above mixture and stirred. The thick orange suspension that formed was filtered off and washed with water. The crystals thus obtained were dried under a vacuum. The product was recrystallized in nitromethane to give a thin golden platelet.

Figure 1:
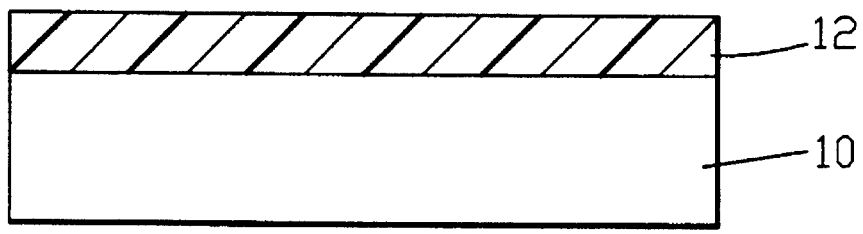
FIGS. 1, 2, 3, 4, and 5 are cross-sectional views showing the structures of different embodiments of optical devices in accordance with the invention.

Referring to FIG. 1, in a first embodiment of the invention, a 5 wt % solution of $(C_{10}H_{21}NH_3)_2PbI_4$ in acetone was spin-coated on a one-inch diameter quartz disc 10 to form a thin film 12. The spinning speed was 2000 rpm.

Instead of acetone, other suitable solvents for $(C_{10}H_{21}NH_3)_2PbI_4$ such as dimethoxy ethane may be used.

Figure 7:
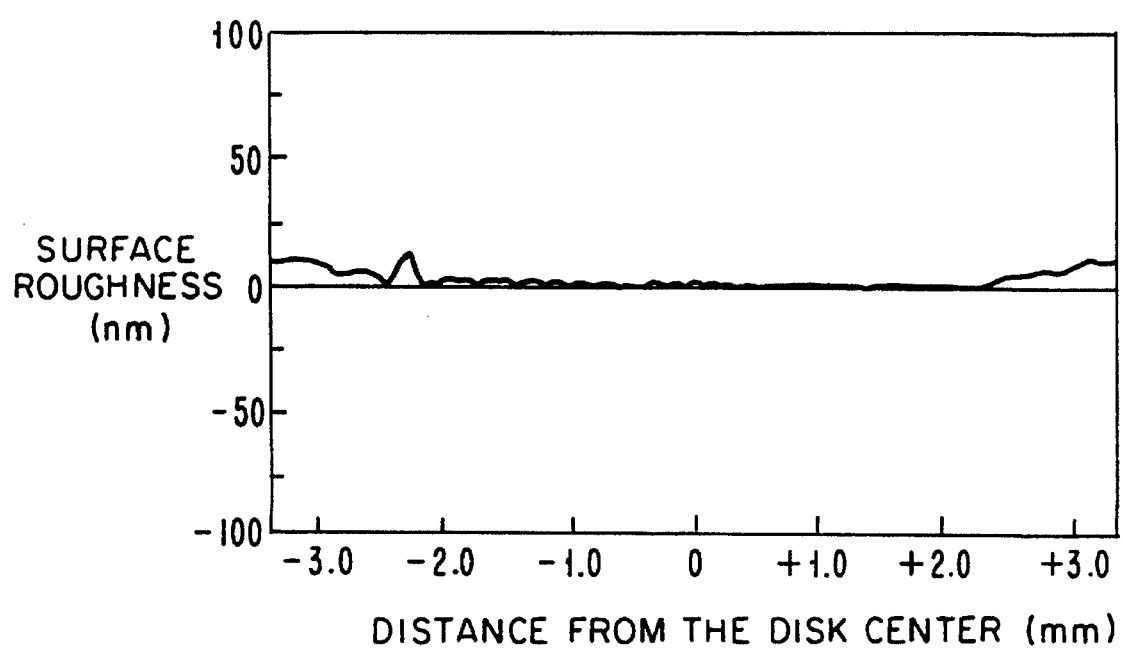
FIG. 7 is a graph showing the result of interferometry measurements taken on the film formed in accordance with the invent ion.

The thickness and smoothness of the thin film 12 were measured by a WYKO interferometry system. The result is shown in FIG. 7. Thus an optically flat thin film having 100 nm thickness and less than _/100 surface roughness was obtained, except at the edge of the substrate.

Figure 6:
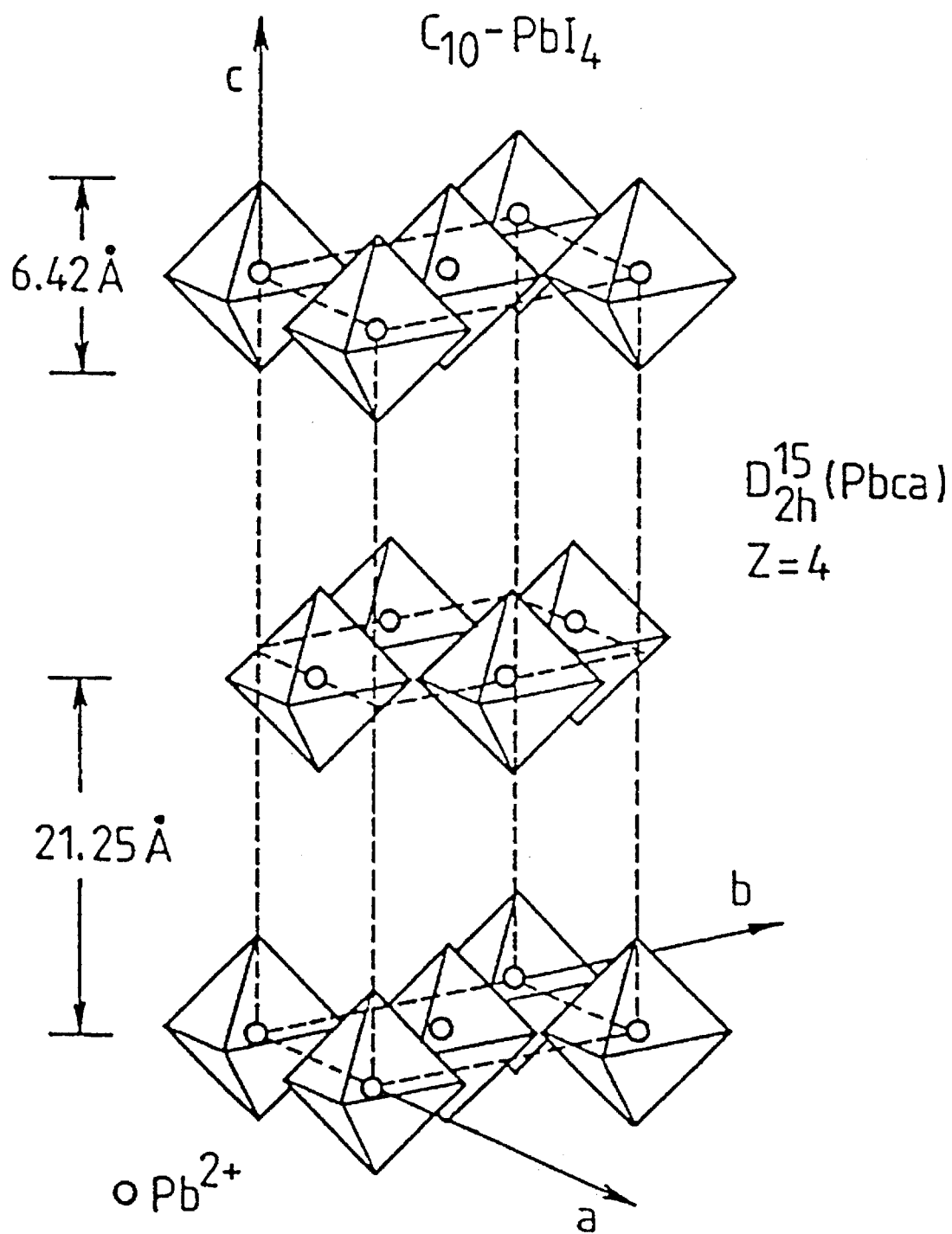
FIG. 6 is a crystal structure model depicting the single-crystal structure of $(C_{10}H_{21}NH_3)_2PbI_4$.
Figure 8:
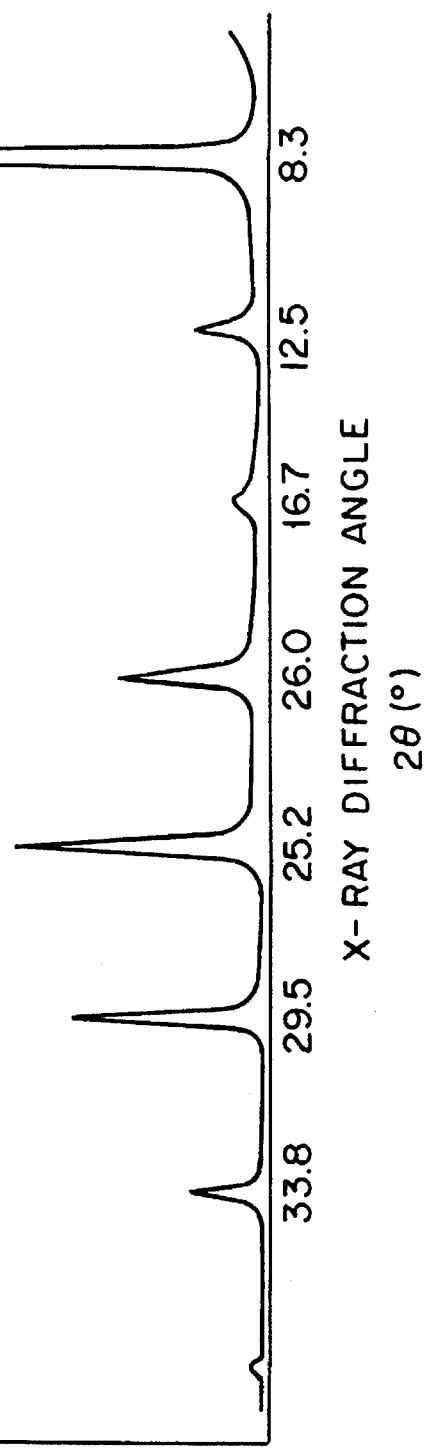
FIG. 8 is a graph showing the X-ray diffraction distribution of the film formed in accordance with the invention.

The crystal structure of the film 12 was evaluated by X-ray diffraction measurement. The X-ray diffraction intensity is plotted against the diffraction angle in FIG. 8. The data shows the existence of very good periodicity for 21.3 Å, which is the distance of separation of the two-dimensional Pb layers of the crystal along the c axis (FIG. 6). This result implies that the planes of $PbI_4$, which each constitute a quantum well, are stacked up with a period of 21.25Å, as in a crystal, to form a multi-quantum-well structure along the substrate surface. The film is not necessarily a single crystal, although no crystallinity in the direction of the a and b axes could be detected. However, even in a single crystal of $(C_{10}H_{21}NH_3)_2PbI_4$ the quantum confinement mechanism depends solely on the well structure along the c axis. Thus the optical properties based on this mechanism will be observed, even when the quantum well structure is present only in the direction of the c axis.

Figure 9:
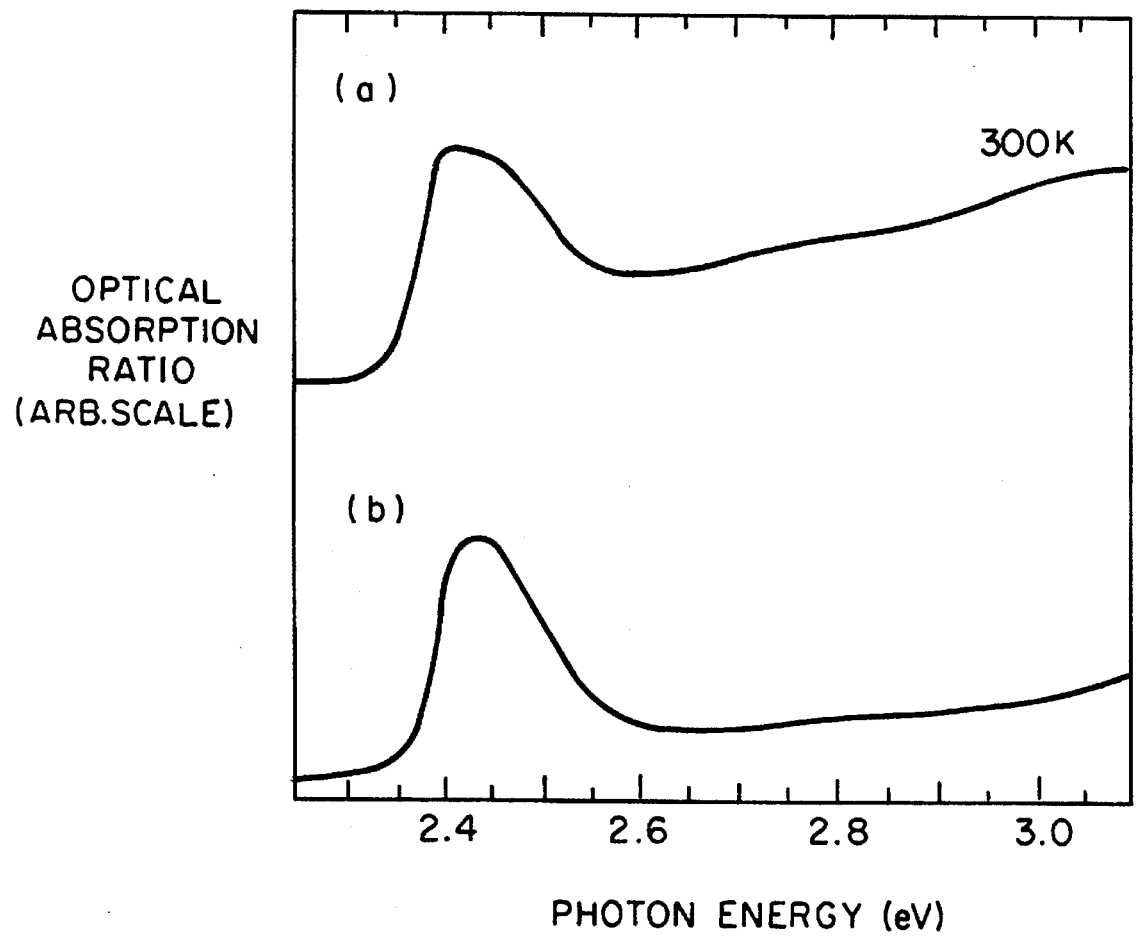
FIG. 9 is a graph showing the absorption spectra obtained, respectively, from the thin film of this invention and from a single crystal.

The absorption spectrum of a film (made from 5% solution) is shown as curve (b) in FIG. 9. A strong peak at approximately 2.42 eV, which is due to exciton absorption in the $PbI_4$ quantum well, was observed. This is also the case for a single crystal as shown in curve (a) of FIG. 9.

Observation with an optical microscope showed that there was no visible crystal domain structure in the thin-film layer. On the other hand, when a 10 wt % solution of $(C_{10}H_{21}NH_3)_2PbI_4$ was used for spin coating, the thin film became opaque and many crystal domains were observed.

With conventional technology, it takes several months to grow bulky single crystals having dimensions of 2×2×0.1 mm$^3$. With the present invention, powder crystals are utilized, which can be obtained in only half a day, to form, very quickly by spin coating, on a substrate, an optical-quality thin-film crystal with a large active area. The technology of spin coating the thin film with the optical property described above has the potential to take the place of the previously used manufacturing methods, such as MBE and MOCVD processes, for which complex and costly equipment and sophisticated techniques are required.

Figure 2:
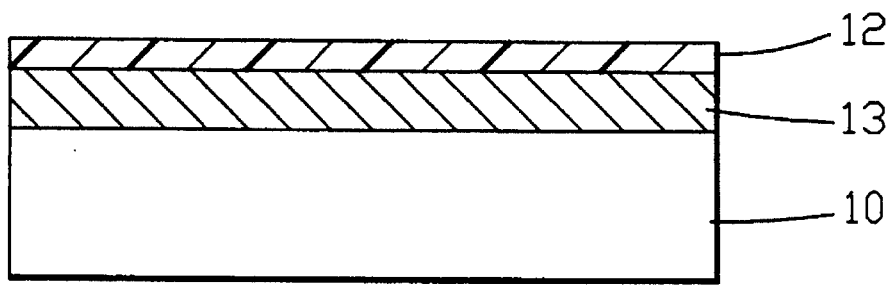

FIG. 2 illustrates a second embodiment of the invention similar to that of FIG. 1. In this case, a 1-μm Corning 7059 glass layer that was sputtered onto a quartz substrate 10 to form an optical waveguide layer 13 included. Then a 200-nm thin-film layer 12 of $(C_{10}H_{21}NH_3)_2PbI_4$ was produced by spin coating, in a manner similar to the method described in the embodiment of FIG. 1. With this arrangement, photons having an energy of 2.4 eV along the direction of the thin film 12 and 7059 glass waveguide layer 13 are projected into optical waveguide layer 13. For waveguide mode excitation, a prism coupler method is utilized such as that described by D. L. Lee in *Electromagnetic Principles of Integrated Optics,* Chapter 6, pp 147–170, John Wiley & Sons. With the irradiation of the optical beam path in the waveguide by a source of 2.45-eV piloton energy and a 2-ps pulse width, in a direction normal to the substrate, the intensity of the 2.4 eV light beam was increased by a factor of 27. This optical modulation by light illustrates the ultra-high-speed response of $(C_{10}H_{21}NH_3)_2PbI_4$.

Figure 3:
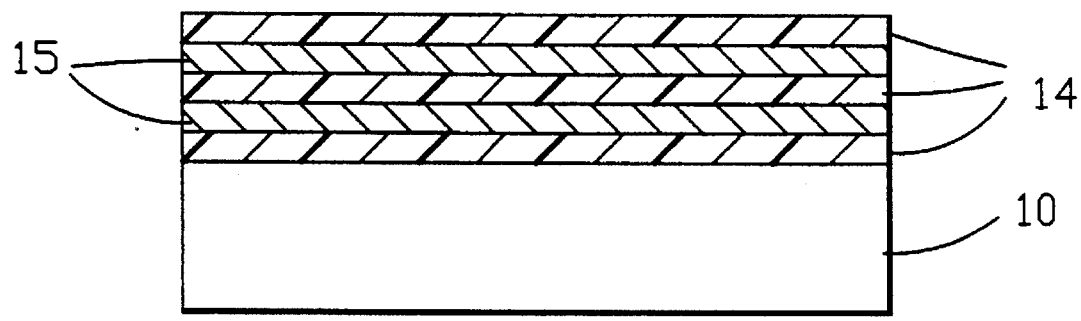

Referring to FIG. 3, a third embodiment of the invention contains a multi-layer structure of $(C_{10}H_{21}NH_3)_2PbI_4$ layers 14 and poly- (di-n-hexylsilane) lithography resist layers 15. These layers were 100 nm and 300 nm thick, respectively. The spin coating of the $(C_{10}H_{21}NH_3)_2PbI_4$ layer was done in the same manner as in the embodiment of FIG. 1. The high-molecular-weight poly- (di-n-hexylsilane) layers were also made by Spill coating of a 2.5% solution of the material in isooctane.

An optical modulation experiment was conducted with this structure. The wavelengths of the incident beam and control beam were the same as described above with respect to the embodiment of FIG. 2. In this case, the sample was irradiated by first parallel beams in a direction normal to the plane of the various layers and also by the controlling light beam at an angle of incidence of 15° with respect to the first beam. For a series of optical image information processes, observations were made with a charge coupled device (CCD) TV camera from the direction opposite to that of the incident light beam array.

Figure 4:
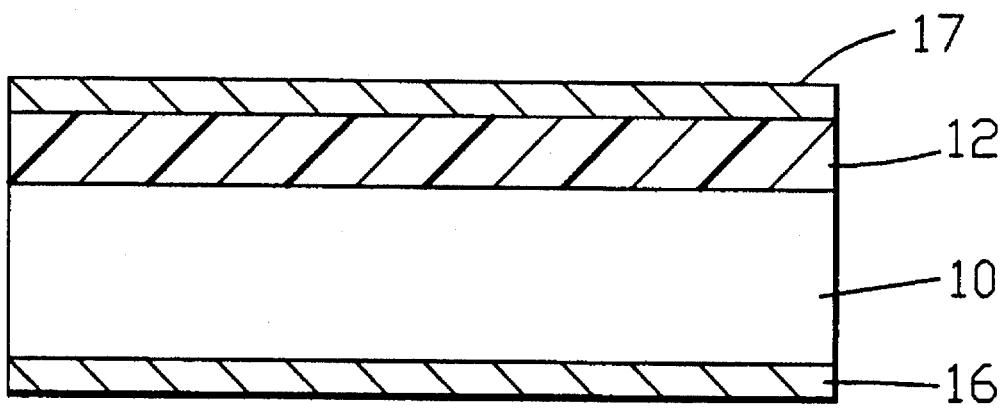
Figure 10:
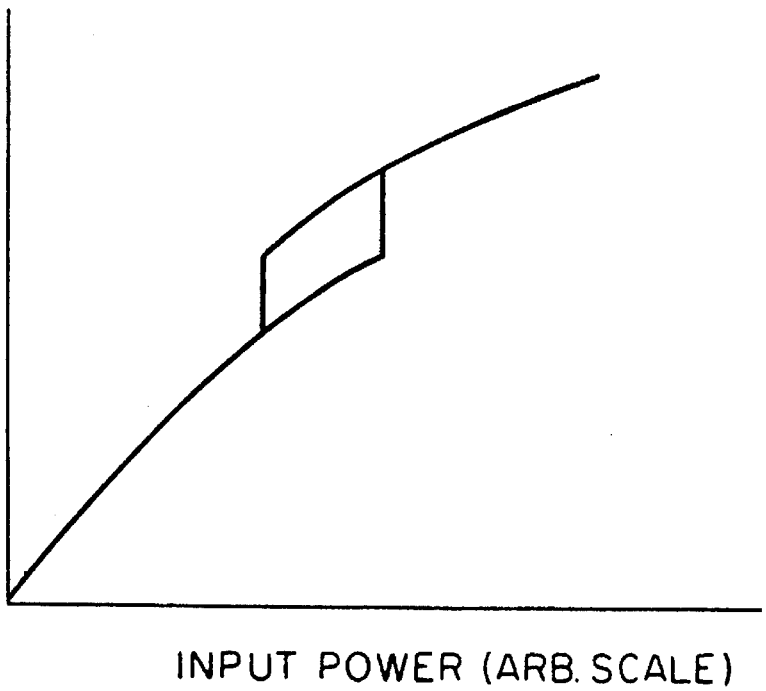
FIGS. 10 and 11 are graphs representing the bistable characteristics of different embodiments of the invention.

Referring to FIG. 4, a fourth embodiment of the invention is illustrated. A thin film 12 of $(_{10}H_{21}NH_3)_2PbI_4$ was formed on a quartz substrate 10 as in the manner described for the embodiment of FIG. 1. Then gold was vapor-deposited on the thin film 12 to form a semi-transparent mirror 17 and on the opposite side of substrate 10 to form a mirror 16. The two mirrors 16 and 17 constitute an optical resonator. A light beam of 2.45-ev photon energy was introduced at a normal incidence to the substrate. The light intensity after passing through the resonator had the optically bistable characteristic illustrated in FIG. 10.

Figure 5:
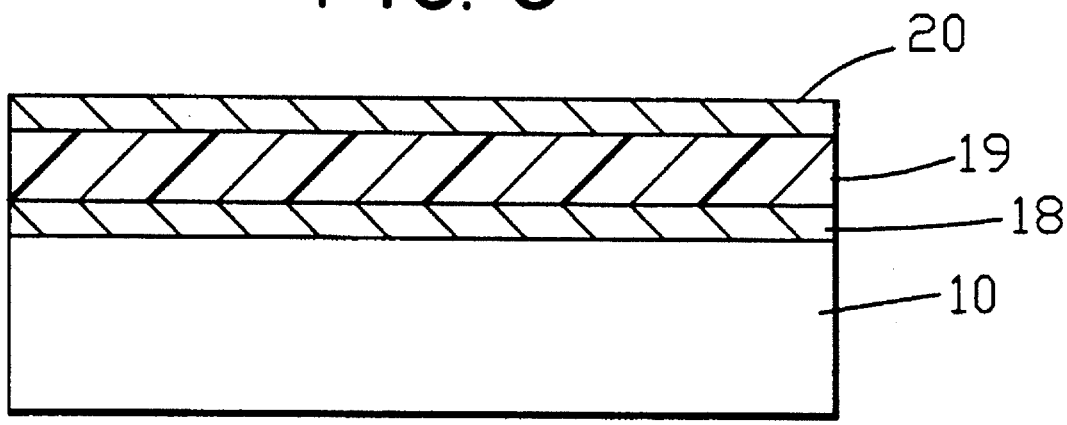
Figure 11:
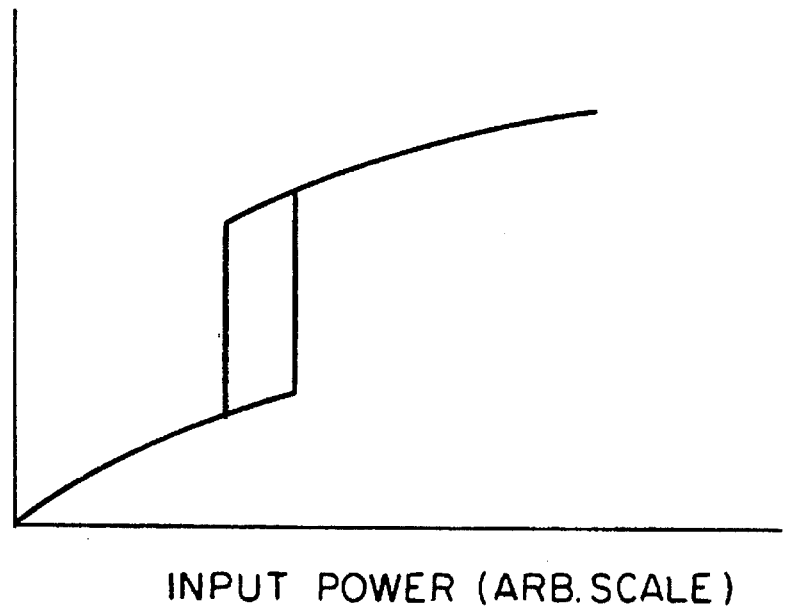

FIG. 5 illustrates a fifth embodiment of the invention. A quartz disc substrate 10 with a semitransparent gold mirror 18 formed thereon was used as in the embodiment of FIG. 4. A thin film 19 of $(C_5H_{11}NH_3)_2PbI_4$ in the form of two-dimensional perovskite was formed over mirror 18 on the metal layer side of substrate 10. Then, a half mirror 20 was formed over this film 19. An optically bistable characteristic (illustrated in FIG. 11) which is similar to that of the embodiment of FIG. 4 was observed.

Other two-dimensional perovskites, $MX_4(C_nH_{2n+1}NH_3)_2$, were also synthesized and used as thin films. }{ere M represents a metal ion such as Cu, Cd, Mn or Fe, and X represents either a halide ion or an I, Cl, or Br ion. Alkyl-ammoniums with n=3, 5, 8, and 10 of the mono-ammonium family, were used. In these perovskites, the periodicity originating from the quantum well structure of the spin-coated thin-film layer was observed.

In summary, the present invention makes it possible to provide the quantum well mechanism without using the single-crystal manufacturing process, which is complex and time-consuming, thereby enabling a nonlinear optical device to be produced at low cost and by a simple process.

What is claimed is:

1. A method for producing a nonlinear optical device comprising:

providing a solution of an organic material comprising $(C_{10}H_{21}NH_3)_2PbI_4)$ in a solvent; and spin coating a quantity of said solution on a substrate to form an organic material film on the substrate, the film having crystal axes, one of the crystal axes of the film being oriented in a direction normal to said substrate, the film having a structure of two different layers thinner than the film alternately intercalated in said direction.

2. The method of claim 1 further comprising the step of providing the organic material so that said film comprises a quantum well system.

3. The method of claim 2 wherein said organic material is provided so that said quantum well system is a composition modulated structure.

4. The method of claim 1 further comprising step of providing said organic material so that said layers differ in energy gap.

5. The method of claim 1 wherein said film has a thickness of approximately 100 nanometers.

6. The method of claim 1 wherein said solvent is one of acetone and dimethoxyl ethane.

7. The method of claim 1 further comprising the step of providing said organic material so that said different layers are a semiconductor layer and an organic layer.

8. The method of claim 1 further comprising the step of providing said organic material so that said two different layers have different energy gaps.

9. A method for producing a nonlinear optical device comprising:

providing a solution of $(C_{10}H_{21}NH_3)_2PbI_4$ at a concentration lower than 10 wt % in acetone, and spin coating said solution on a substrate at a spin speed higher than 2,000 rpm, to form a film of $(C_{10}H_{21}NH_3)_2PbI_4$ having at least one crystal with one crystal axis of said at least one crystal oriented in a direction normal to the substrate, the film having a modulated structure of two alternately intercalated layers in said direction, the layers thinner than the film differing in energy gap.

10. A method for producing a nonlinear optical device comprising:

providing a solution of an organic material in a solvent, said organic material being comprised of $MX_4(C_nH_{2n+1}NH_3)_2$ where M is a metal ion selected from the group consisting of Cu, Cd, Mn, Ge and Fe, and X is a halogen ion selected from the group consisting of I, Cl and Br; and spin coating a quantity of said solution on a substrate to form an organic material film on the substrate, the film having crystal axes, one of the crystal axes of the film being oriented in a direction normal to said substrate, the film having a structure of two different layers thinner than the film alternately intercalated in said direction.

11. The method of claim 10 further comprising the step of selecting the organic material so that the film comprises a quantum well system.

12. The method of claim 11 wherein said organic material is provided to that said quantum well system is a composition modulated structure.

13. The method of claim 10 further comprising the step of providing said organic material so that said different layers differ in energy gap.

14. The method of claim 10 wherein said film has a thickness of approximately 100 nanometers.

15. The method of claim 10 wherein said solvent is one of acetone and dimethoxyl ethane.

16. The method of claim 10 further comprising the step of providing said organic material so that said different layers are a semiconductor layer and an organic layer.

\* \* \* \* \*